Oct. 27, 1931.  W. H. WAMBSGANS  1,829,551
KNEE JOINT FOR ARTIFICIAL LIMBS
Filed Aug. 9, 1930
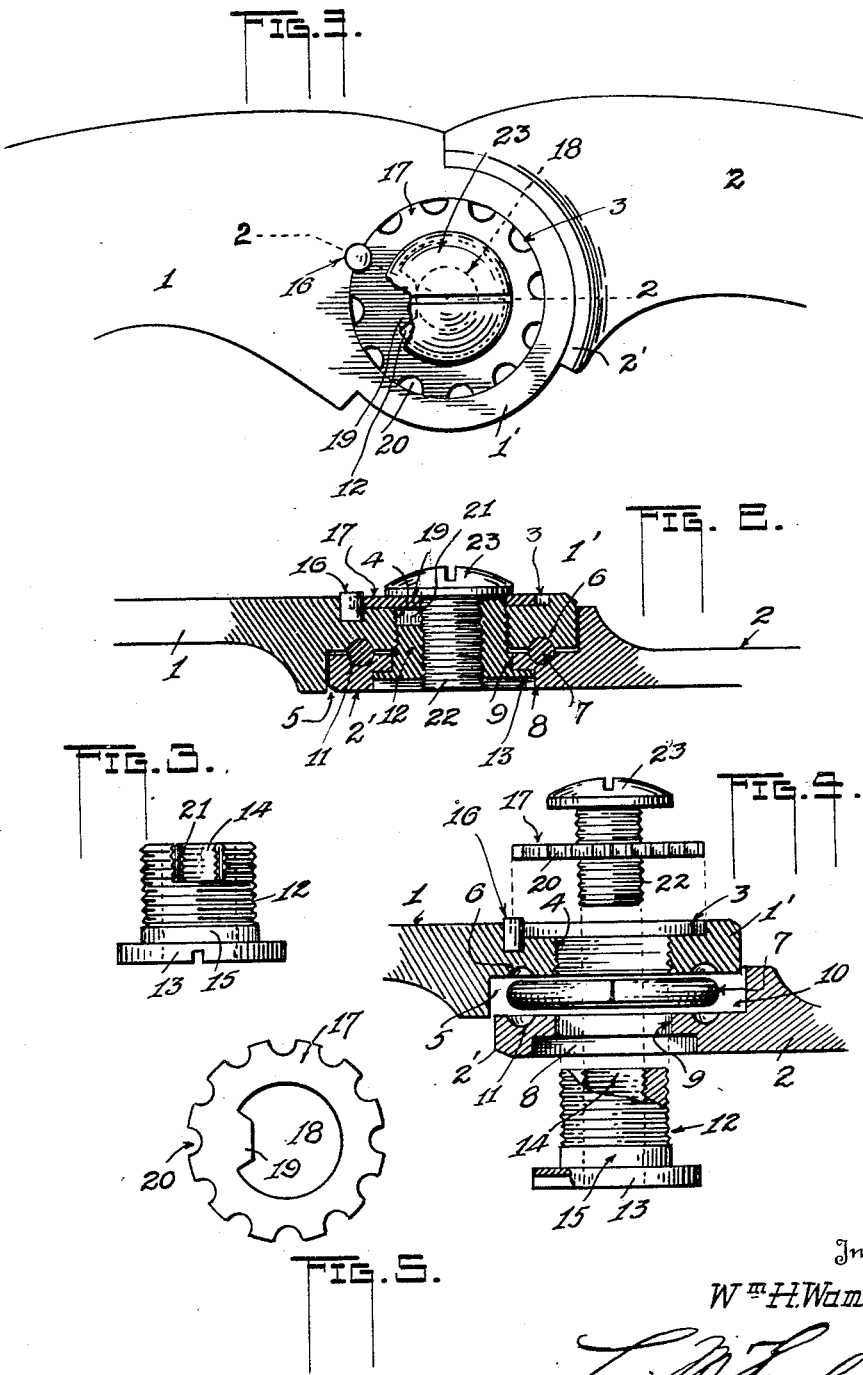

Patented Oct. 27, 1931

1,829,551

UNITED STATES PATENT OFFICE

WILLIAM H. WAMBSGANS, OF PEORIA, ILLINOIS, ASSIGNOR TO JOINT MANFG. CO., OF PEORIA, ILLINOIS, A CORPORATION OF ILLINOIS

KNEE-JOINT FOR ARTIFICIAL LIMBS

Application filed August 9, 1930. Serial No. 474,145.

This invention pertains to joints for artificial limbs, being directed particularly to the construction of that type known as a knee joint.

The object of the invention is to provide a structure in a knee joint that will be thoroughly rigid; that can be made quite thin, as a requirement, and above all of a form of construction by which exactness of adjustment can be had and the parts positively fixed in position relatively, and operating freely and smoothly with no looseness developing.

In the appended drawings my improved joint is illustrated in all its details as an aid to the full understanding of the invention.

Figure 1 is a plan of the two connected parts each for attachment to a section of an artificial limb, not shown.

Figure 2 is a longitudinal section of the said parts and the connecting means therefor on line 2—2 of Figure 1.

Figure 3 is an elevation of a threaded sleeve.

Figure 4 is a longitudinal section of the parts shown in Figures 1 and 2, the same being separated, together with portions of the joint, all being separated the better to show their relation one to the other, and Figure 5 is a plan of a lock washer.

In the figures, 1 and 2 designate the usual strap-members for attachment in any usual way to the limb-sections, not shown. Each includes a head 1' and 2' respectively, one to face the other, the head 1' having a shallow circular recess 3 in its outer face and also having a central threaded bore 4, being cavitied at 5 on its inner face to receive the head 2', while a groove 6 concentric with the bore 4 is adapted to receive wear-ring 7 for example.

The head 2' also has a shallow recess 8 in its outer surface and has a smooth bore 9 adjacent thereto, said head having a cavity 10 to receive the head 1', and likewise having in its inner surface a groove 11 corresponding to the groove 6 and to receive the said wearring 7.

A sleeve 12 is now provided, threaded on its outer surface, the same having a head 13 slotted, for example, after the manner of a screw-thread, said sleeve having a threaded bore 14, it being noted that the threads on the outer surface of the sleeve terminate distant from the head 13 leaving a smooth portion or shank at 15 which is adapted to have a smooth working fit in the bore 9 of said head 2'. Secured in the head 1' is a pin 16 which in this instance lies partially within the recess 3. A lock-washer 17 has a central bore 18 into which extends a part 19 as part of such washer, while the outer margin of the latter has a series of indentations or notches 20 corresponding in outline to the form of the pin 16. The washer is adapted to lie in the recess 3 and its part 19 engages in a recess 21 of the sleeve 12 as best shown in Figure 2, but this can only occur when one of the notches 20 can also engage the pin 16. Lastly, a set-screw 22 engages the threads of the bore 14 of the said sleeve 12, the head 23 of the screw adapted to seat upon the lockwasher 17, holding it in its seat, the shank of the screw preferably extending substantially the full length of the threaded bore 4 to thereby assist in stabilizing the whole structure and add strength thereto, the wide spread of the screw-head and that of the sleeve-head 13 also acting to that end.

With a low pitch of the threads of the sleeve that engage in the bore 4 of the head 1' and a close spacing of the notches 20 of the washer 17 the said sleeve may be given a "micrometer" adjustment or such an adjustment that every or any slight looseness may be taken up in the fitting of the heads 1' and 2' on the wear-ring and yet without binding, a smooth working fit resulting. That is to say, in almost any adjustment of the sleeve a notch of the washer can engage the pin 16 while the part 19 of the washer can engage the recess 21 of the sleeve. The screw 22, of course, takes no strain whatever, merely acting to maintain the lock-washer in its seat to maintain the adjusted relation of the sleeve to the head 1'.

The structure provided is simple, it is rigid in the extreme, and it is quite impossible for the parts to change their positions relatively. The joint is therefore thoroughly reliable at all times and under the most severe strains that might be imposed.

Clearly, I may make use of lock-washers of slightly different form so long as the positive engagement thereof with the sleeve and the pin 16, or other part of the head 1', is maintained.

I claim:

A knee joint for artificial limbs comprising, in combination, two portions each a part of a limb section, one overlying the other and one of them having a threaded bore, a sleeve having a threaded bore and externally threaded to engage in the said threaded bore of the portion, the same being free to be adjusted relatively to both the named portions, said sleeve having a recess in the wall of its threaded extremity, a member having a bore adapted to receive the sleeve and including a part extending into its said bore in the plane of said member adapted to engage in the recess, a part seated in the portion having the threaded bore, and said member having a series of indentations encircling its bore any one of which is adapted to engage the last named part, and a headed screw adapted to engage in the threaded bore of the sleeve, its head adapted to bear upon said member.

In testimony whereof I affix my signature.

WILLIAM H. WAMBSGANS.